United States Patent [19]
Iihoshi

[11] Patent Number: 5,945,939
[45] Date of Patent: *Aug. 31, 1999

[54] MULTIBEAM FM RADAR SYSTEM

[75] Inventor: Akira Iihoshi, Wako, Japan

[73] Assignee: Honda Giken Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/852,155

[22] Filed: May 6, 1997

[30] Foreign Application Priority Data

May 9, 1996 [JP] Japan ................................ 8-139553

[51] Int. Cl.⁶ ........................ G01S 13/536; G01S 13/93
[52] U.S. Cl. ........................ 342/70; 342/112; 342/129
[58] Field of Search ........................ 342/70, 112, 117, 342/128, 129, 109; 367/101

[56] References Cited

U.S. PATENT DOCUMENTS

| | | | |
|---|---|---|---|
| 5,181,037 | 1/1993 | Komatsu | 342/70 |
| 5,268,692 | 12/1993 | Grosch et al. | 342/70 |
| 5,448,244 | 9/1995 | Komatsu et al. | 342/70 |
| 5,652,589 | 7/1997 | Ono et al. | 342/70 |

FOREIGN PATENT DOCUMENTS

| | | |
|---|---|---|
| 5-142338 | 5/1993 | Japan . |
| 5-150035 | 5/1993 | Japan . |

*Primary Examiner*—Ian J. Lobo
*Attorney, Agent, or Firm*—Lyon & Lyon LLP

[57] ABSTRACT

A multibeam FM radar system has an FM radar module for transmitting beams of FM signals whose frequencies linearly vary in rising and falling periods, in respective different directions with adjacent ones of the beams overlapping each other, receiving echo signals from a given beam, and mixing the FM signals and the echo signals into beat signals corresponding to said given beam. The multibeam FM radar system also has a main radar circuit including a central processing unit for identifying pairs of beat frequencies in the beat signals corresponding to said given beam, and processing the pairs of the frequencies to calculate distances up to and/or relative speeds with respect to objects within said given beam which have produced the echo signals, while comparing the frequencies within said identified pairs of beat frequencies to beat frequencies within a beam adjacent to said given beam to produce a detected result corresponding to an object producing echo signals within said given beam.

9 Claims, 6 Drawing Sheets

MULTIBEAM FM RADAR SYSTEM

BACKGROUND OF THE INVENTION

1. Field of the Invention

The present invention relates to an FM radar system for use as a distance/speed detector in a collision alarm system on motor vehicles, and more particularly to a multibeam FM radar system for radiating a plurality of FM radar beams in respective different directions with adjacent ones of the FM radar beams overlapping each other.

2. Description of the Prior Art

FM millimeter-wave radar devices for use as distance/speed detectors in collision alarm systems on motor vehicles are known from "Radar technology" published by the Society of Electronic Information Communications. The known FM millimeter-wave radar devices radiate a signal whose frequency increases or decreases in a triangular wave pattern with time and receive an echo signal reflected by another motor vehicle. The received echo signal is mixed with the transmitted signal, generating a beat signal. The distance up to the motor vehicle and the speed thereof are detected from the frequency f of the beat signal (beat frequency f).

FIG. 1A of the accompanying drawings shows the frequency of an FM signal radiated from an FM radar system on a moor vehicle and the frequency of an echo signal reflected by another motor vehicle and received by the FM radar system. The radiated and received signals have a frequency which varies in a triangular wave pattern with time. In FIG. 1A, it is assumed that the motor vehicles are running at the same speed, i.e., the relative speed between the motor vehicles is nil. As shown in FIG. 1A, while the frequency of the radiated FM signal is linearly increasing in a rising period, the frequency of the received echo signal which appears with a time lag is lower than the frequency of the radiated FM signal. On the other hand, while the frequency of the radiated FM signal is linearly decreasing in a falling period, the frequency of the received echo signal which appears with a time lag is higher than the frequency of the radiated FM signal. If the motor vehicles are running at respective different speeds, i.e., the relative speed between the motor vehicles is not nil, then as shown in FIG. 1B of the accompanying drawings, a Doppler shift fp depending on the relative speed between the motor vehicles is introduced into the beat frequency f that is generated if the relative speed between the motor vehicles is nil.

The Doppler shift fp affects in opposite directions the beat frequency fu detected during the rising period of the frequency of the radiated FM signal and the beat frequency fd detected during the falling period of the frequency of the radiated FM signal. Specifically, these beat frequencies fu, fd are given as follows:

$$fu = f - fp \quad (1)$$

$$fd = f + fp \quad (2)$$

From the above equations (1), (2), the following equations are obtained:

$$f = (fu + fd)/2 \quad (3)$$

$$fp = (fu - fd)/2 \quad (4)$$

The distance R between the motor vehicles and the relative speed u between the motor vehicles are expressed as follows:

$$R = cf/(4fm \cdot \Delta f) \quad (5)$$

$$u = cfp/2fo \quad (6)$$

where c is the speed of light, $\Delta f$ the range across which the frequency of the transmitted FM signal is variable, fm the period at which the frequency of the transmitted FM signal is variable, and fo is the central frequency of the transmitted FM signal.

The beat frequency is usually detected when the beat frequency is subjected to a fast-Fourier transform (FFT). FIG. 1C of the accompanying drawings shows a frequency spectrum of the beat signal produced by the fast-Fourier transform. As shown in FIG. 1C, a pair of beat frequencies (fu, fp) in the rising and falling periods, which are shifted by the Doppler shift fp from the beat frequency f that is generated if the relative speed between the motor vehicles is nil, appears on opposite sides of the beat frequency f.

If there is only one motor vehicle which reflects an echo signal to the FM radar system, then the distance up to the motor vehicle and the relative speed with respect thereto can easily be detected from the above pair of beat frequencies and the equations (3)~(6). However, if there are plural motor vehicles which reflect respective echo signals to the FM radar system, then the FM radar system detects a plurality of beat frequencies, and needs to carry out a complex process for making proper pairs of these beat frequencies, i.e., pairing the beat frequencies.

According to one conventional pairing process proposed in Japanese laid-open patent publication No. 5-142337, beat frequencies in the rising and falling periods are sequenced in the order of frequencies, and paired according to the sequence to recognize motor vehicles that have reflected echo signals for thereby detecting the distances up to the motor vehicles and the relative speeds with respect thereto. When a plurality of motor vehicles run closely to each other, however, beat frequencies produced with respect to those motor vehicles tend to switch around due to Doppler shifts and spectral fluctuations. In such a situation, the motor vehicles cannot easily be distinguished only on the basis of the sequence of the beat frequencies.

It often happens in reality that two beat frequencies that have been generated in relation to different motor vehicles are superposed to the extent that they appear as a single beat frequency on the frequency spectrum. Since it is difficult to distinguish those overlapping beat frequencies from each other, beat frequencies that are involved cannot easily be paired. One proposal revealed in Japanese laid-open patent publication No. 5-150035 is that missing data is compensated for by past data based on the linear prediction that the speeds of motor vehicles are constant. However, when the speed of a motor vehicle changes abruptly or one of paired beat frequencies is not detected for a long period of time, a distance that has been made up for by past data is apt to be widely different from the actual distance. Another problem is that a motor vehicle which suddenly enters the range of the radar system upon a lane change cannot be compensated for because no past data is available for that motor vehicle.

SUMMARY OF THE INVENTION

It is therefore an object of the present invention to provide a multibeam FM radar system for detecting distances up to a plurality of closely running motor vehicles and relative speeds thereof by distinguishing the motor vehicles accurately from each other, pairing beat frequencies generated with respect to the motor vehicles, and carrying out necessary calculations.

According to the present invention, there is provided a multibeam FM radar system comprising an FM radar module for transmitting beams of FM signals whose frequencies linearly vary in rising and falling periods, in respective different directions with adjacent ones of the beams overlapping each other, receiving echo signals, and mixing the FM signals and the echo signals into beat signals, and a processor for producing pairs of frequencies of the beat signals in the rising and falling periods with respect to the beams, and processing the pairs of the frequencies to detect distances up to and/or relative speeds with respect to objects which have produced the echo signals, while reflecting a detected result with respect each of the beams in a detected result with respect an adjacent one of the beams.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENT

Figure 1A:
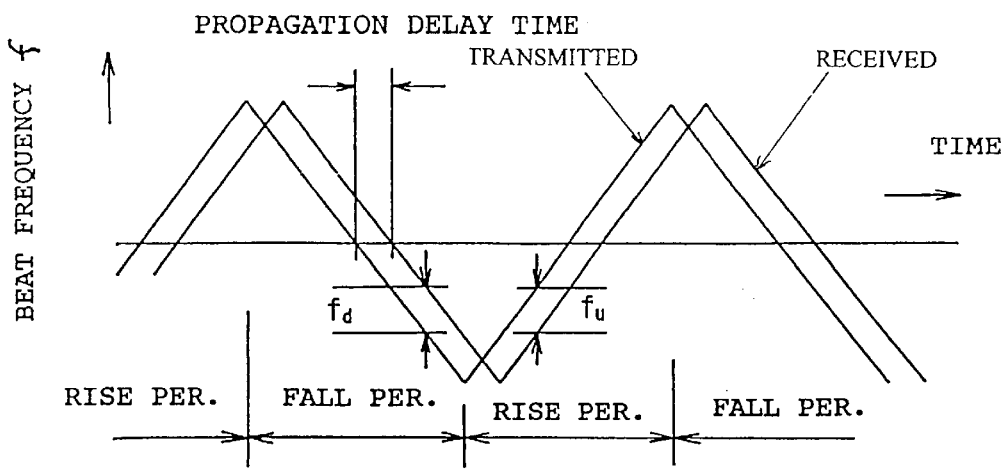
FIGS. 1A through 1C are diagrams illustrative of principles of operation of an FM radar system and the manner in which a Doppler shift and beat frequencies are detected.
Figure 1B:
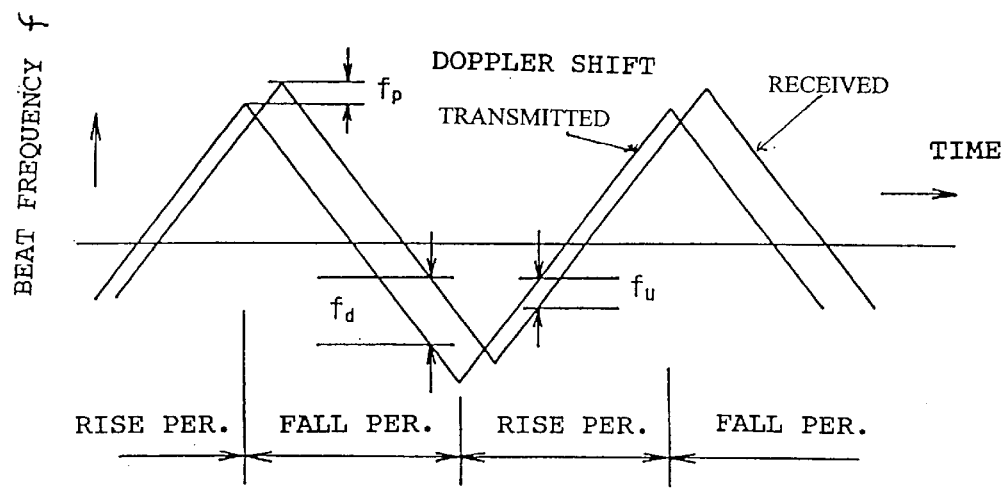
Figure 1C:
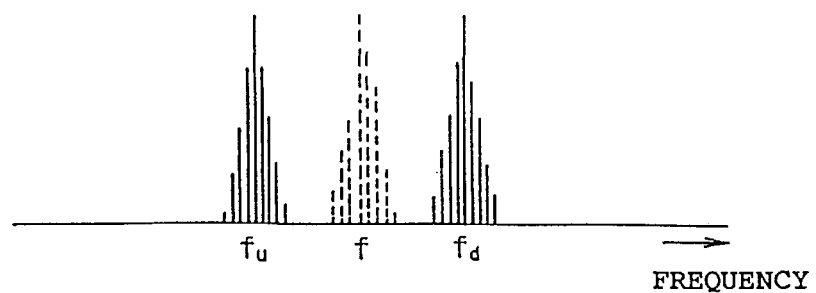
Figure 2:
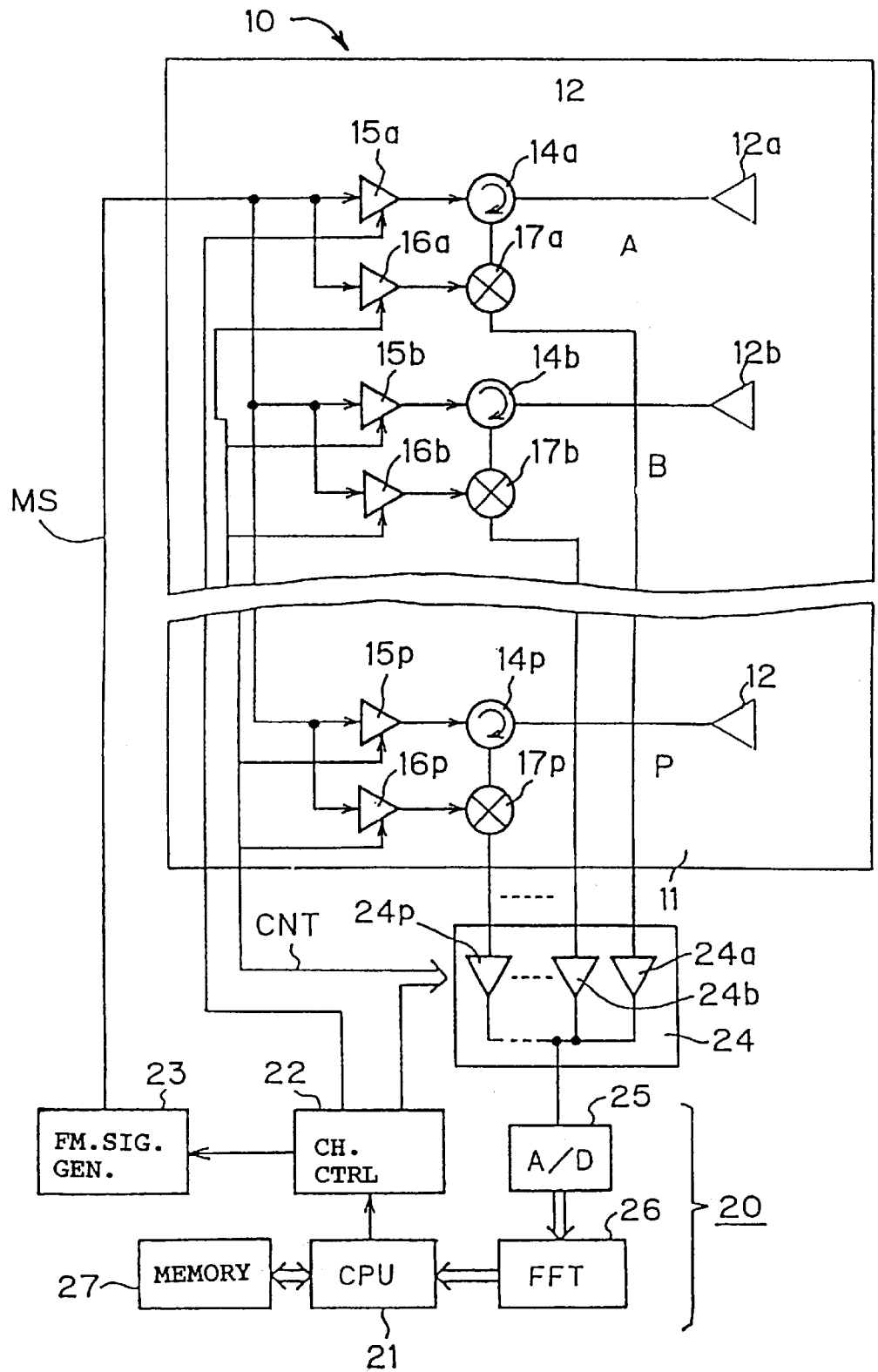
FIG. 2 is a block diagram of a multibeam FM radar system according to the present invention.

FIG. 2 shows in block form a multibeam FM radar system according to the present invention.

As shown in FIG. 2, the multibeam FM radar system generally comprises an FM radar module 10 and a main radar circuit 20. The multibeam FM radar system is preferably installed on a motor vehicle (not shown).

The FM radar module 10 comprises a dielectric substrate 11 and an antenna assembly 12 mounted thereon. The antenna assembly 12 comprises a plurality of (16 in the illustrated embodiment) transmitting/receiving channels A~P disposed on the dielectric substrate 11. The transmitting/receiving channels A~P comprise respective transmitting/receiving planar array antenna elements 12a~12p and respective transmitting/receiving assemblies connected thereto.

The transmitting/receiving assemblies have respective circulators 14a~14p, respective selective transmission amplifiers 15a~15p, respective selective reception amplifiers 16a~16p, and respective mixers 17a~17p. The transmitting/receiving channels A~P receive FM (frequency-modulated) millimeter-wave signals to be transmitted which are supplied from an FM signal generator 23 in the main radar circuit 20 through a microstrip line MS.

The main radar circuit 20 comprises a CPU (central processing unit) 21, a channel controller 22, an FM signal generator 23, a selector 24, an A/D (analog-to-digital) converter 25, an FFT (fast Fourier transform) circuit 26, and a memory 27.

The FM millimeter-wave signals from the FM signal generator 23 are supplied through the microstrip line MS to the respective selective transmission amplifiers 15a~15p and the respective selective reception amplifiers 16a~16p of the transmitting/receiving channels A~P, and are selectively amplified only in given periods successively by the respective selective transmission amplifiers 15a~15p in the respective transmitting/receiving channels A~P according to channel control signals supplied from the channel controller 22.

Figure 3:
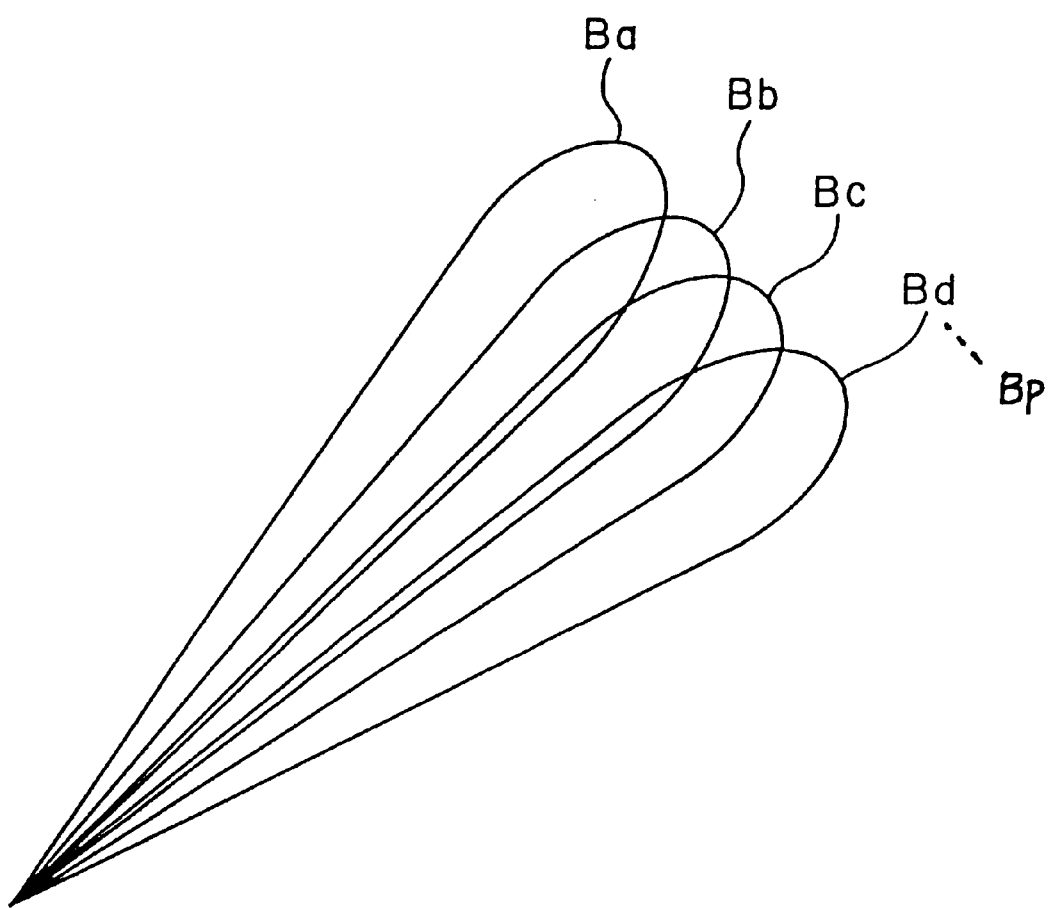
FIG. 3 is a diagram showing a pattern of FM signal beams radiated from the multibeam FM radar system shown in FIG. 2.

The FM millimeter-wave signals amplified by the respective selective transmission amplifiers 15a~15p are supplied through the respective circulators 14a~14p to the respective planar array antenna elements 12a~12p, which then radiate the FM millimeter-wave signals as FM signal beams Ba, Bb, Bc, Bd (see FIG. 3), for example, into space outside of the motor vehicle on which the multibeam FM radar system is installed. As can be seen from the FM signal beams Ba, Bb, Bc, Bd, the directivity patterns of the respective planar array antenna elements 12a~12p are substantially the same as each other, and have their central axes slightly shifted successively in a horizontal plane.

Some of the FM millimeter-wave signals radiated as the FM signal beams out of the motor vehicle are reflected by objects such as motor vehicles, travel back to and are received by the planar array antenna elements 12a~12p. The reflected signal beams which are received by the planar array antenna elements 12a~12p are separated as FM echo signals from the transmitting channels by the circulators 14a~14p, respectively. The separated FM echo signals are supplied to the respective received signal input terminals of the mixers 17a~17p. The other local oscillator input terminals of the mixers 17a~17p are supplied with amplified FM millimeter-wave signals from the selective reception amplifiers 16a~16p which successively amplify FM millimeter-wave signals intermittently only in given periods according to channel control signals supplied from the channel controller 22. The selective reception amplifiers 16a~16p function as respective switches as with the selective transmission amplifiers 15a~15p.

Beat signals outputted from respective output terminals of the mixers 17a~17p are transmitted to the selector 24. In the selector 24, the beat signals are amplified by respective amplifiers 24a~24b. The amplified beat signals are then supplied through a signal line such as a coaxial cable to the A/D converter 25, which converts the beat signals into digital beat signals. The digital beat signals are then supplied to the FFT circuit 26, and converted thereby into a frequency spectrum that is then supplied to the CPU 21.

The CPU 21 analyzes the frequency spectrum of the received FM echo signals supplied from the FFT circuit 26, calculates distances up to and relative speeds with respect to the motor vehicles which have produced the FM echo signals in the respective transmitting/receiving channels A~P and hence at respective bearings of the FM signal beams Ba~Bp, and generates a two-dimensional map of distances and bearings of the motor vehicles in a spatial distribution. Specifically, the CPU 21 pairs beat frequencies in rising and falling periods, and adds and subtracts the paired beat frequencies to detect distances up to and relative speeds with respect to motor vehicles that have reflected the FM signal beams. At this time, the CPU 21 pairs the beat frequencies while reflecting the detected result with respect each FM signal beam in the detected result with respect an adjacent FM signal beam. Such a beat frequency processing process of the CPU 21 will be described in detail below with reference to FIGS. 4A and 4B.

Figure 4A:
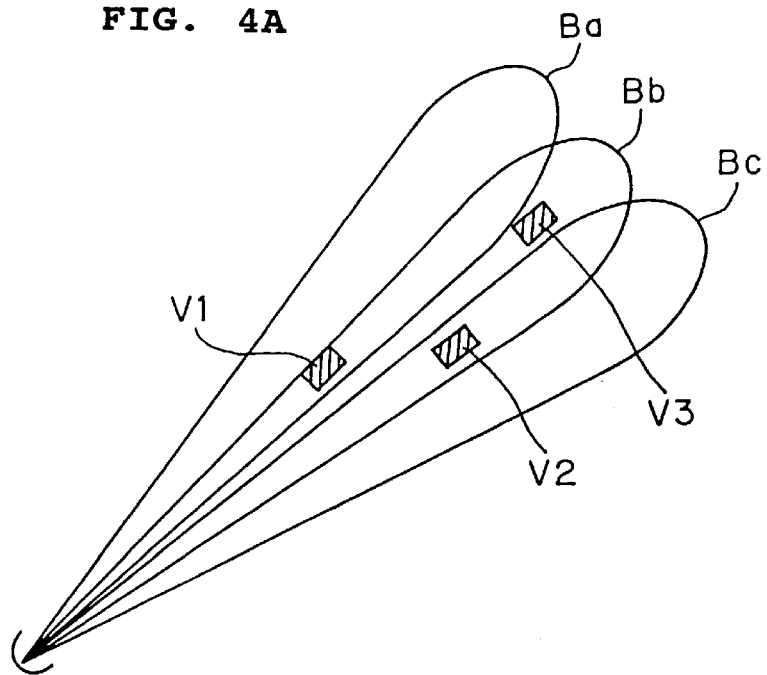
FIGS. 4A and 4B are diagrams illustrative of a beat frequency processing process carried out by the multibeam FM radar system shown in FIG. 2, FIG. 4A showing the positional relationship between FM signal beams radiated from the multibeam FM radar system and motor vehicles, FIG. 4B showing beat frequencies generated with respect to the motor vehicles.
Figure 4B:
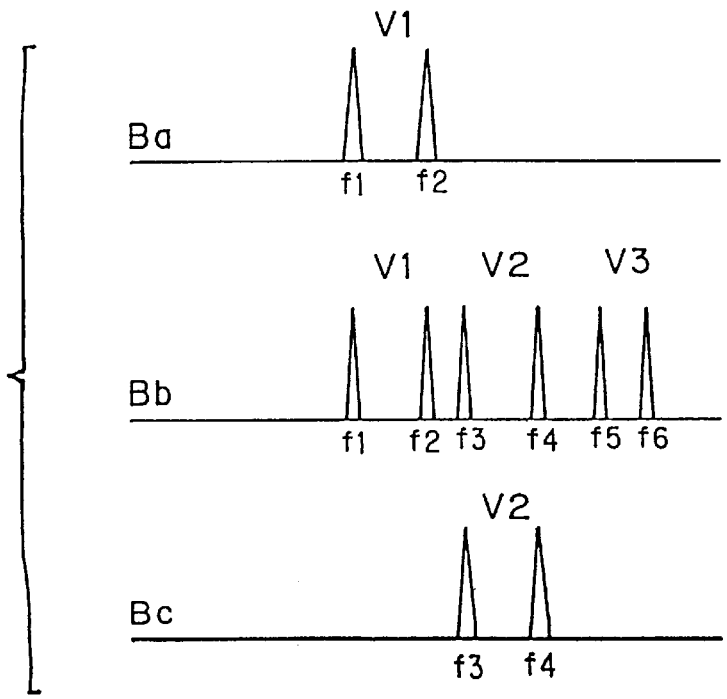

As shown in FIGS. 4A and 4B, it is assumed that the FM signal beams radiated from the planar array antenna elements 12a~12p are represented by three adjacent beams Ba, Bb, Bc, and the motor vehicles running closely to each other are represented by three motor vehicles V1, V2, V3 which are positionally related to each other as shown in FIG. 4A. In FIG. 4A, only the motor vehicle V1 can be detected by the beam Ba, all the motor vehicles V1, V2, V3 can be detected by the beam Bb, and only the motor vehicle V2 can be detected by the beam Bc. If the relative speeds between the motor vehicle on which the multibeam FM radar system is installed and the motor vehicles V1, V2, V3 are not nil, then the frequency spectrums of beat signals produced with respect to the beams Ba, Bb, Bc include beat frequencies in the rising and falling periods as shown in FIG. 4B.

The CPU 21 inspects the beat frequencies produced with respect to the beams Ba~Bc, pairs the beat frequencies with priority for those beams which involve fewer beat frequencies, and calculates distances up to and relative speeds with respect to the motor vehicles V1, V2, V3 based on the paired beat frequencies. Specifically, the CPU first processes the beat frequencies with respect to the beams Ba, Bc each involving two beat frequencies in preference to the beam Bb involving six beat frequencies.

Since the beam Ba involves only one pair of beat frequencies f1, f2, the CPU 21 assumes it as a pair of beat frequencies (fu, fd) generated by one motor vehicle, i.e., the motor vehicle V1. Then, the CPU 21 imparts a predetermined likelihood ratio $\gamma$, which is given when only a pair of beat frequencies is produced by one beam, with respect to the beam Ba, and calculates a distance up to and a relative speed with respect to the motor vehicle V1 from the pair of beat frequencies according to the equations (3)~(6). The CPU 21 then determines whether the calculated distance and relative speed are of reasonable values in view of the detecting capability of the multibeam FM radar system and the running capability of the motor vehicle, e.g., whether the motor vehicle exists at a far distance beyond the detecting capability of the multibeam FM radar system or not and whether the relative speed is impossibly high or not. If the calculated distance and relative speed are of reasonable values, then the CPU 21 imparts a likelihood ratio $\beta$ greater than the likelihood ratio $\gamma$ to the calculated distance and relative speed.

Similarly, since the beam Bc involves only one pair of beat frequencies f3, f4, the CPU 21 assumes it as a pair of beat frequencies (fu, fd) generated by one motor vehicle, i.e., the motor vehicle V2. Then, the CPU 21 imparts the predetermined likelihood ratio $\gamma$ with respect to the beam Bc, and calculates a distance up to and a relative speed with respect to the motor vehicle V2 from the pair of beat frequencies according to the equations (3)~(6). The CPU 21 then determines whether the calculated distance and relative speed are of reasonable values. If the calculated distance and relative speed are of reasonable values, then the CPU 21 imparts the likelihood ratio $\beta$ greater than the likelihood ratio $\gamma$ to the calculated distance and relative speed.

After having processed beat frequencies with respect to the beams Ba, Bc, the CPU 21 starts processing the beat frequencies with respect to the beat Bb. The CPU 21 detects that the beat frequencies f1, f2 with respect to the beam Bb are identical to the beat frequencies f1, f2 with respect to the beam Ba and that the likelihood ratio $\beta$ has already been imparted with respect to the beam Ba. Then, the CPU 21 imparts a likelihood ratio $\alpha$, greater than the likelihood ratio $\beta$, to the result obtained for the beam Ba with respect to the beat frequencies f1, f2, and excludes the pair of beat frequencies f1, f2 from further processing with respect to the beam Bb.

Likewise, the CPU 21 detects that the beat frequencies f3, f4 with respect to the beam Bb are identical to the beat frequencies f3, f4 with respect to the beam Bc and that the likelihood ratio $\beta$ has already been imparted with respect to the beam Bc. Then, the CPU 21 imparts the likelihood ratio $\alpha$, greater than the likelihood ratio $\beta$, to the result obtained for the beam Bc with respect to the beat frequencies f3, f4, and excludes the pair of beat frequencies f3, f4 from further processing with respect to the beam Bb.

As a result of having excluded the beat frequencies f1, f2, f3, f4 from the beat frequencies with respect to the beam Bb according to the above algorithm, the CPU 21 detects that the beam Bb involves only a pair of frequencies f5, f6. The CPU 21 now assumes it as a pair of beat frequencies (fu, fd) generated by one motor vehicle, i.e., the motor vehicle V3. Then, the CPU 21 imparts the predetermined likelihood ratio $\gamma$ with respect to the beam Bc, and calculates a distance up to and a relative speed with respect to the motor vehicle V3 from the pair of beat frequencies according to the equations (3)~(6). The CPU 21 then determines whether the calculated distance and relative speed are of reasonable values. If the calculated distance and relative speed are of reasonable values, then the CPU 21 imparts the likelihood ratio $\beta$ greater than the likelihood ratio $\gamma$ to the calculated distance and relative speed.

Therefore, the CPU 21 produces data of the distance and relative speed with the likelihood ratio $\alpha$ with respect to each of the motor vehicles V1, V2, and data of the distance and relative speed with the likelihood ratio $\beta$ with respect to the motor vehicle V3. After having processed the beat frequencies with respect to the beams, the CPU 21 erases all other data than the data to which likelihood ratios not less than the likelihood ratio $\beta$ are imparted.

Figure 5A:
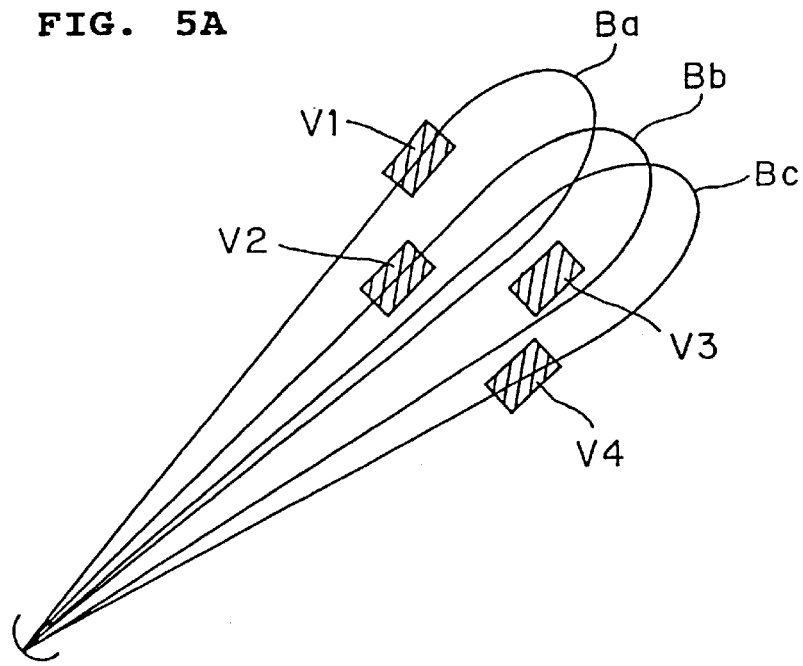
FIGS. 5A and 5B are diagrams illustrative of another beat frequency processing process carried out by the multibeam FM radar system shown in FIG. 2, FIG. 5A showing the positional relationship between FM signal beams radiated from the multibeam FM radar system and motor vehicles, FIG. 5B showing beat frequencies generated with respect to the motor vehicles.
Figure 5B:
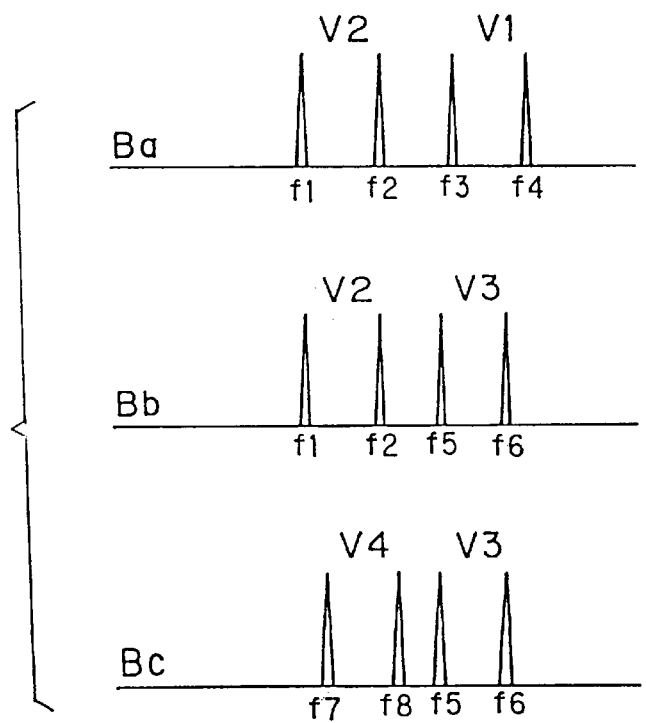

Another beat frequency processing process executed by the CPU 21 will be described below with reference to FIGS. 5A and 5B. In FIG. 5A, motor vehicles V1, V2 can be detected by the beam Ba, motor vehicles V2, V3 can be detected by the beam Bb, and motor vehicles V3, V4 can be detected by the beam Bc. If the relative speeds between the motor vehicle on which the multibeam FM radar system is installed and the motor vehicles V1, V2, V3, V4 are not nil, then the frequency spectrums of beat signals produced with respect to the beams Ba, Bb, Bc include beat frequencies in the rising and falling periods as shown in FIG. 5B.

The CPU 21 compares the beat frequencies produced with respect to the beam Ba and the beat frequencies produced with respect to the beam Bb. If the CPU 21 recognizes that a pair of beat frequencies f1, f2 produced with respect to the beam Ba and a pair of beat frequencies f1, f2 produced with respect to the beam Bb are the same as each other, then the CPU 21 assumes it as a pair of beat frequencies (fu, fd)

generated by one motor vehicle, i.e., the motor vehicle V2. Then, the CPU 21 imparts a predetermined likelihood ratio γ, which is given when such a pair of beat frequencies is produced by both of adjacent beams, with respect to the beams Ba, Bb, and calculates a distance up to and a relative speed with respect to the motor vehicle V2 from the pair of beat frequencies according to the equations (3)–(6).

The CPU 21 then determines whether the calculated distance and relative speed are of reasonable values in view of the detecting capability of the multibeam FM radar system and the running capability of the motor vehicle. If the calculated distance and relative speed are of reasonable values, then the CPU 21 imparts a likelihood ratio β greater than the likelihood ratio γ to the calculated distance and relative speed. The CPU 21 excludes the pair of beat frequencies f1, f2, to which the likelihood ratio β has been imparted, from the beat frequencies with respect to the beams Ba, Bb.

Similarly, the CPU 21 compares the beat frequencies produced with respect to the beam Bb and the beat frequencies produced with respect to the beam Bc. If the CPU 21 recognizes that a pair of beat frequencies f5, f6 produced with respect to the beam Bb and a pair of beat frequencies f5, f6 produced with respect to the beam Bc are the same as each other, then the CPU 21 assumes it as a pair of beat frequencies (fu, fd) generated by one motor vehicle, i.e., the motor vehicle V3. Then, the CPU 21 imparts the predetermined likelihood ratio γ with respect to the beams Bb, Bc, and calculates a distance up to and a relative speed with respect to the motor vehicle Vc from the pair of beat frequencies according to the equations (3)–(6).

The CPU 21 then determines whether the calculated distance and relative speed are of reasonable values in view of the detecting capability of the multibeam FM radar system and the running capability of the motor vehicle. If the calculated distance and relative speed are of reasonable values, then the CPU 21 imparts the likelihood ratio β greater than the likelihood ratio γ to the calculated distance and relative speed. The CPU 21 excludes the pair of beat frequencies f5, f6, to which the likelihood ratio β has been imparted, from the beat frequencies with respect to the beams Bb, Bc.

Because the pair of beat frequencies f1, f2 has been excluded, only a pair of beat frequencies f3, f4 remains in the frequency spectrum of beat signals with respect to the beam Ba. The CPU 21 assumes it as a pair of beat frequencies (fu, fd) generated by one motor vehicle, i.e., the motor vehicle V1. Then, the CPU 21 imparts a predetermined likelihood ratio γ, which is given when only a pair of beat frequencies is produced by one beam, with respect to the beam Ba, and calculates a distance up to and a relative speed with respect to the motor vehicle V1 from the pair of beat frequencies according to the equations (3)–(6). The CPU 21 then determines whether the calculated distance and relative speed are of reasonable values. If the calculated distance and relative speed are of reasonable values, then the CPU 21 imparts a likelihood ratio β greater than the likelihood ratio γ to the calculated distance and relative speed.

Because the pair of beat frequencies f5, f6 has been excluded, only a pair of beat frequencies f7, f8 remains in the frequency spectrum of beat signals with respect to the beam Bc. The CPU 21 assumes it as a pair of beat frequencies (fu, fd) generated by one motor vehicle, i.e., the motor vehicle V4. Then, the CPU 21 imparts the predetermined likelihood ratio γ, which is given when only a pair of beat frequencies is produced by one beam, with respect to the beam Bc, and calculates a distance up to and a relative speed with respect to the motor vehicle V4 from the pair of beat frequencies according to the equations (3)–(6). The CPU 21 then determines whether the calculated distance and relative speed are of reasonable values. If the calculated distance and relative speed are of reasonable values, then the CPU 21 imparts the likelihood ratio β greater than the likelihood ratio γ to the calculated distance and relative speed.

Inasmuch as the pair of beat frequencies f1, f2 and the pair of beat frequencies f5, f6 are excluded from the frequency spectrum of beat signals with respect to the beam Bb, no beat frequencies to be processed remain in the frequency spectrum of beat signals produced with respect to the beam Bb.

Figure 6A:
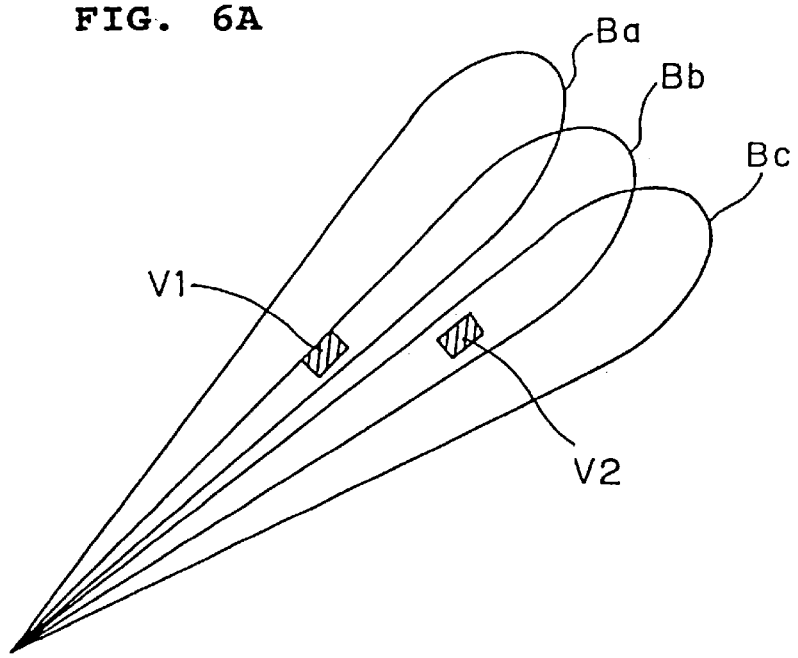
FIGS. 6A and 6B are diagrams illustrative of still another beat frequency processing process carried out by the multibeam FM radar system shown in FIG. 2, FIG. 6A showing the positional relationship between FM signal beams radiated from the multibeam FM radar system and motor vehicles, FIG. 6B showing beat frequencies generated with respect to the motor vehicles.
Figure 6B:
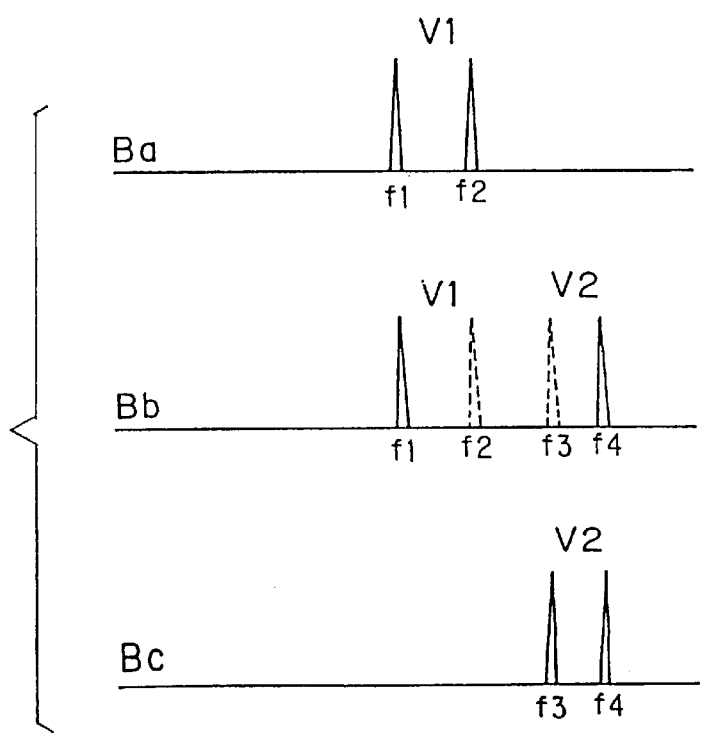

Still another beat frequency processing process executed by the CPU 21 will be described below with reference to FIGS. 6A and 6B. In FIG. 6A, a motor vehicle V1 can be detected by the beams Ba, Bb, and a motor vehicle V2 can be detected by the beams Bb, Bc. If the relative speeds between the motor vehicle on which the multibeam FM radar system is installed and the motor vehicles V1, V2 are not nil, then the frequency spectrums of beat signals produced with respect to the beams Ba, Bb, Bc have beat frequencies in the rising and falling periods as shown in FIG. 5B. It is assumed that beat frequencies indicated by the dotted lines in FIG. 5B are missing and are not actually generated due to noise or the like.

In FIG. 5B, no beat frequencies f2, f3 are present in the frequency spectrum of beat signals produced with respect to the beam Bb. The CPU 21 detects pairs of beat frequencies f1, f2 and f3, f4 from the frequency spectrums of beat signals produced with respect to the beams Ba, Bc, with a predetermined likelihood ratio γ. If distances up to and relative speeds with respect to the motor vehicles, which have been calculated from those beat frequencies, are of reasonable values, then the CPU 21 imparts the distances and relative speeds a likelihood ratio β higher than the likelihood ratio γ.

The CPU 12 pairs the beat frequencies f1, f4 with respect to the beam Bb and calculates a relative speed from a Doppler shift caused by the beat frequencies f1, f4. Since the calculated relative speed is abnormally high, the CPU 12 decides that the pairing of the beat frequencies f1, f4 is inappropriate. The CPU 12 makes a final decision in view of another possibility that a motor vehicle with no relative speed may exist in a position at a distance determined from the beat frequencies f1, f4 and also still another possibility that the beat frequencies f2, f3 are missing from the frequency spectrum of beat signals produced with respect to the beam Bb.

Specifically, the CPU 21 calculates a likelihood ratio that there is a motor vehicle with no relative speed from the beat frequencies f1, f2 involved by the beams Ba, Bb, as $\epsilon = k \cdot ABS(f2_{Bb} - f1_{Ba})$ where ABS(X) represents the absolute value of X. If the calculated likelihood ratio ε is greater than the likelihood ratio β, then the CPU 21 decides that there is a motor vehicle with no relative speed, and calculates a distance up to that motor vehicle. If the calculated likelihood ratio ε is smaller than the likelihood ratio β, then the CPU 21 decides that a beat frequency (f2 in this case) is missing from the frequency spectrum relative to the beam Bb. The CPU 21 then compensates for a beat frequency f2 from the frequency spectrum relative to the beam Ba, and calculates a distance and a relative speed from the paired beat frequencies f1, f2. The calculated likelihood ratio ε is greater if a single beat frequency f1 is present in the frequency spectrum relative to an adjacent beam, e.g., if only a beat frequency f1 is present in the frequency spectrum relative to the adjacent beam Bc.

The pairing process for calculating distances and relative speeds has been described above. As an alternative, a process disclosed in Japanese laid-open patent publication No. 7-318635 based on a patent application filed by the present applicants may be combined to determine a two-dimensional position.

In the above pairing process, a missing beat frequency is compensated for in order to match beat frequencies in the frequency spectrums relative to adjacent beams with each other for the pairing of the beat frequencies. However, when beat frequencies are superposed into a single beat frequency in the frequency spectrum of beat signals produced with respect to a certain beam, a beat frequency having the same value as the single beat frequency may be added to provide two beat frequencies in order to match beat frequencies in the frequency spectrums relative to adjacent beams with each other.

As described above, the multibeam FM radar system according to the present invention operates based on the fact that it radiates and receives a plurality of FM signal beams, and pairs beat frequencies in order to match detected results with respect to the beams with each other or pairs beat frequencies successively from those beams which have fewer beat frequencies. In this manner, the multibeam FM radar system reflects the detected result with respect to each FM signal beam in the detected result with respect to an adjacent FM signal beam. The multibeam FM radar system is thus capable of detecting distances up to a plurality of closely running motor vehicles and relative speeds thereof by distinguishing the motor vehicles accurately from each other.

Although a certain preferred embodiment of the present invention has been shown and described in detail, it should be understood that various changes and modifications may be made therein without departing from the scope of the appended claims.

What is claimed is:

1. An FM radar system comprising:
   an FM radar module for transmitting beams of FM signals whose frequencies linearly vary in rising and falling periods, in respective different directions with adjacent ones of the beams overlapping each other, receiving echo signals from a given beam, and mixing the FM signals and the echo signals into beat signals corresponding to said given beam; and
   a processor for identifying pairs of beat frequencies in the beat signals corresponding to said given beam, and processing the pairs of frequencies to calculate distances up to and/or relative speeds with respect to objects within said given beam which have produced said echo signals, while comparing the frequencies within said identified pair of beat frequencies to beat frequencies within a beam adjacent to said given beam to produce a detected result corresponding to an object producing echo signals within said given beam.

2. An FM radar system according to claim 1, wherein said processor determines if an object which produced said identified pair of beat frequencies within said given beam also produced beat frequencies in said adjacent beam.

3. An FM radar system according to claim 1, wherein said processor identifies said pairs of beat frequencies in said given beam successively according to whether said given beam possesses fewer beat signals than said adjacent beam.

4. An FM radar system according to claim 2, wherein said processor excludes beat frequencies from said adjacent beam if the beat frequencies were produced by an object which produced an identified pair of beat frequencies in said given beam.

5. An FM radar system according to claim 1, wherein said processor further comprises means for imparting, to the detected result with respect to said given beam, a predetermined likelihood ratio which is variable depending on the number of frequencies of the beat signals with respect to said given beam and the comparison between frequencies of the beat signals with respect to said given beam and frequencies of the beat signals in said adjacent beam.

6. An FM radar system according to claim 1, wherein said processor compensates for a missing beat signal by matching one of the signals within said identified pair to a corresponding pair of beat signals within said adjacent beam.

7. An FM radar system according to claim 1, wherein said processor further comprises means for compensating for a frequency superposing another frequency in order to match the frequencies of the beat signals with respect to said given beam and said adjacent beam with each other.

8. An FM radar system according to claim 1, wherein said FM radar system comprises an electric beam scanning circuit.

9. An FM radar system according to claim 1, wherein said processor comprises means for determining whether the detected distances or relative speeds are of reasonable value.

* * * * *